United States Patent [19]

Dunwoody

[11] 4,450,649
[45] May 29, 1984

[54] FLY TRAP GUN

[76] Inventor: John A. Dunwoody, Box 42, R.D. #2, Pennsburg, Pa. 18073

[21] Appl. No.: 422,686

[22] Filed: Sep. 24, 1982

[51] Int. Cl.$^3$ .............................................. A01M 3/04
[52] U.S. Cl. ...................................... 43/135; 43/136; 124/16; 124/27
[58] Field of Search ......................... 43/135, 136, 134; 124/16, 26, 27, 38

[56] References Cited

U.S. PATENT DOCUMENTS

| | | | |
|---|---|---|---|
| 602,083 | 4/1898 | Kimbel | 43/136 |
| 764,853 | 7/1904 | Kimberlin | 124/26 |
| 1,693,414 | 11/1928 | Tolliver | 124/38 |
| 2,140,875 | 12/1938 | Kahler | 43/135 |
| 2,815,212 | 12/1957 | Hall | 124/38 |

Primary Examiner—Nicholas P. Godici
Assistant Examiner—Thomas S. Mieczkowski
Attorney, Agent, or Firm—Joseph W. Molasky

[57] ABSTRACT

A fly trap gun is provided with a fly trap carried on the end of a firing rod mounted for longitudinal movement within a barrel. The fly trap defines a trap chamber provided with a sticky area throughout a substantial portion thereof for catching flies or the like trapped therein. An actuating means causes the firing rod and the fly trap mounted thereon to move rapidly from a loaded position to a fired position for trapping a flying insect in the trap chamber and for subsequently catching the trapped insect on the sticky surface.

3 Claims, 8 Drawing Figures

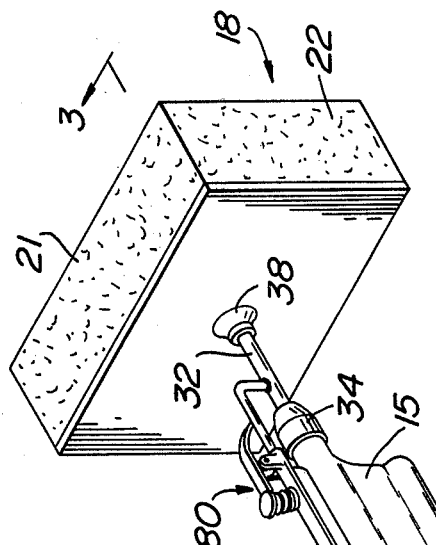
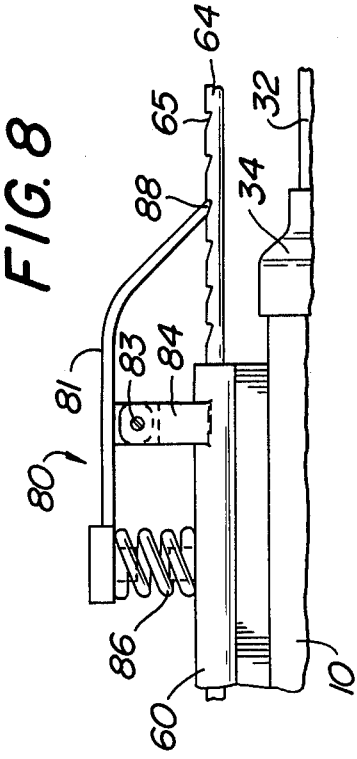
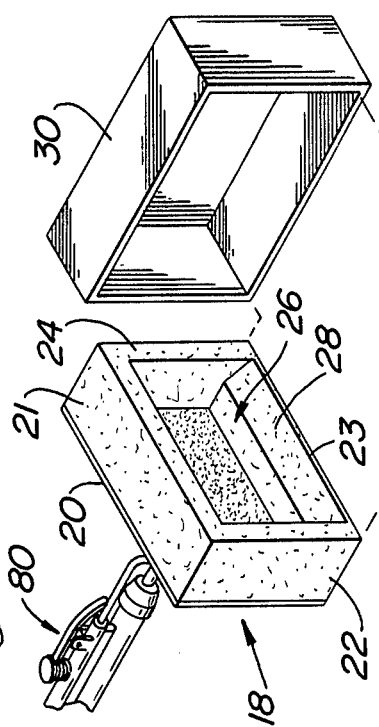
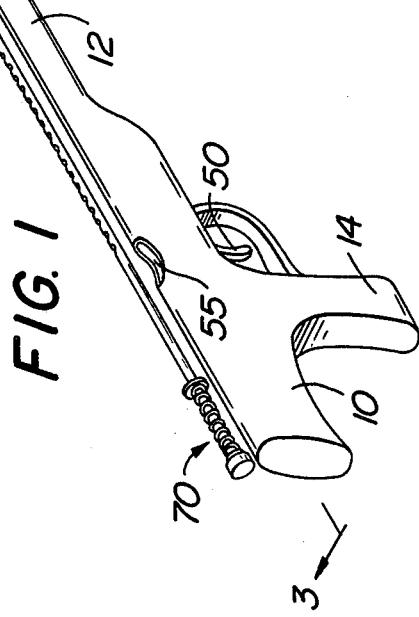
FIG. 1
FIG. 2
FIG. 8

FLY TRAP GUN

BACKGROUND AND SUMMARY OF THE INVENTION

This invention relates generally to fly traps and more particularly to a fly trap gun.

Various means, such as fly swatters or the like, have been used for the killing of flying insects such as flies, mosquitoes, bees, moths, etc. A major disadvantage of these prior art means is that they involve the smashing of the insect so that the remaining debris, in the form of blood and other parts of the insect, causes staining of the surface on which the insect is killed. This is very objectionable in certain places, such as in a house, office or the like.

It is the general object of the present invention to provide a fly trap gun which is very accurate and functions to trap flying insects in a trap chamber until they are caught on a sticky surface in the trap chamber whereupon the gun and the trapped fly can be removed without requiring any cleaning of the surface on which the fly was caught.

A feature of the fly trap gun of the invention is that it is completely sanitary way of getting rid of flying insects.

Another feature of the invention is that the fly trap gun is provided with a replaceable trap which can be replaced when it is completely full.

A further feature of the fly trap gun of the invention is its usefulness for catching any flying insect located on a ceiling out of reach of the user.

A further feature of the fly trap gun in accordance with the invention is that it is constructed for safe usage.

Another feature of the fly trap gun of the invention is that it is designed so that it can be used to scoop up insects which are resting on a horizontal surface such as a table or the like.

Briefly stated, the fly trap gun in accordance with the invention is comprised of a fly trap carried on the end of a firing rod is mounted for longitudinal movement within a barrel. The fly trap defines a trap chamber provided with a sticky area throughout a substantial portion thereof for catching flies or the like trapped therein. An actuating means causes the firing rod and the fly trap mounted thereon to move rapidly from a loaded position to a fired position for trapping a flying insect in the trap chamber and for subsequently catching the trapped insect on the sticky surface.

BRIEF DESCRIPTION OF THE DRAWINGS

FIG. 1 is a perspective view of an embodiment of the invention.

FIG. 2 is a perspective view of the fly trap portion of the embodiment shown in FIG. 1.

FIG. 8 is a fragmentary view of a detail.

DETAILED DESCRIPTION OF THE PREFERRED EMBODIMENT

Figure 3:
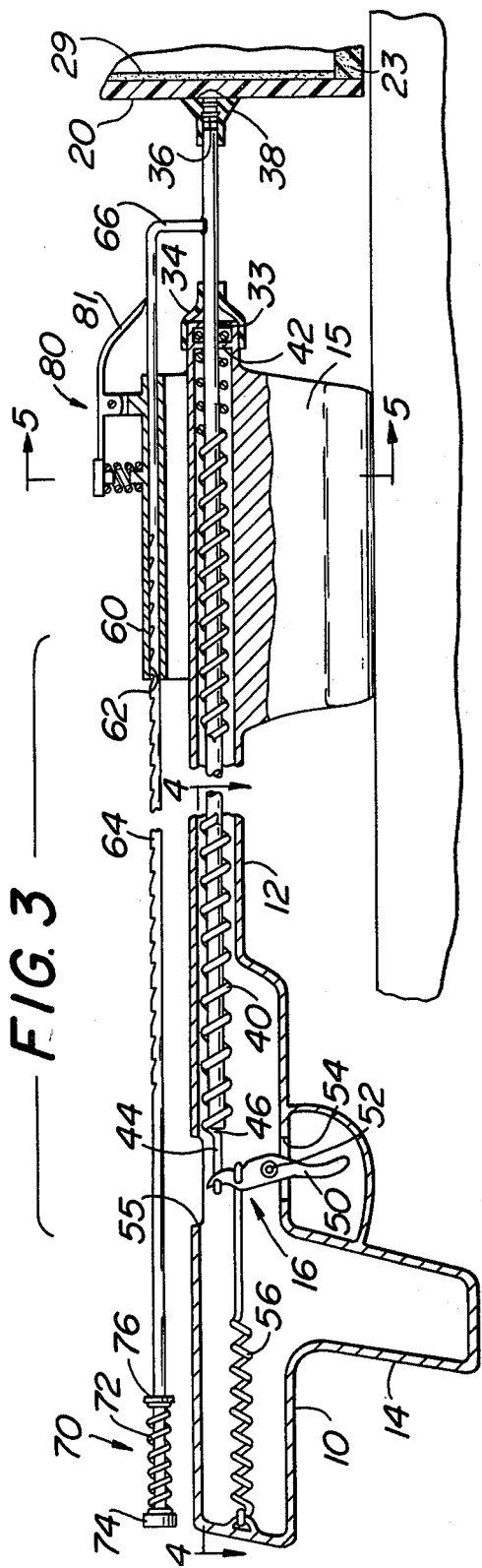
FIG. 3 is a sectional view taken on line 3—3 of FIG. 1.

In FIG. 1 there is shown an embodiment of the invention in the form of a small rifle, which may be of a size of about 2 to 3 feet in length. It will be apparent, however, that the fly trap gun of the invention can be made in various sizes and, for example, could be made in the form of a pistol.

The fly trap gun shown in FIG. 1 comprises a hollow body 10 including an elongated barrel 12 extending from a handle portion 14. Contained within the handle portion 14 is a trigger means 16 which will be described more fully hereafter.

A fly trap, indicated generally at 18, is shown in detail in FIG. 2 and comprises a rectangular base portion 20 and a rectangular side wall portion consisting of four side walls 21, 22, 23 and 24. The internal surfaces of base portion 20 and side walls 21–24 cooperate to define a generally rectangular trap chamber 26. The bottom side wall 23 is provided with a sloping front portion 28 for a purpose to be described hereafter.

In accordance with a novel feature of the invention, base portion 20 of fly trap 18 has the internal wall thereof coated with a sticky substance 29 so as to provide a sticky area throughout a substantial portion of the surface of the trap chamber 26 for catching flies or the like trapped in said trap chamber. The sticky substance may consist of the glue-like material used in conventional fly paper, or it may be any suitable sticky substance. The essential requirement of the sticky substance is that it be capable of catching and holding small flying insects when they come into contact therewith.

Preferably, the base portion 20 is made of a relatively still material such as a clear plastic (synthetic resin) and the side wall portion is made of a resilient foam material (such as polyurethane) which is light in weight and adapted to compress easily. It is also preferable that the sticky substance and the backing member be made of a transparent material so that the user of the apparatus can view the trap chamber 26 through base portion 20.

As shown in FIG. 2, there is provided a rectangular lid 30 which is adapted to fit snugly onto the fly trap 18 by enclosing the side wall portion thereof. The lid 30 thus serves to close the open end of the fly trap 18 and may be used when the fly trap 18 is being stored.

A firing rod 32 is mounted for longitudinal movement within barrel portion 12. To this end, the firing rod 32 extends through an opening 33 in the front of barrel 12. The extended end portion of firing rod 32 located outside of the front end of the barrel 12 has the fly trap 18 mounted thereon.

The mounting means for the fly trap is best shown in FIG. 3 and comprises a pin 36 having a barbed portion projecting from the back side of base portion 20. The pin 36 is secured permanently in the base portion 12, as by use of a suitable adhesive, and is frictionally received at its barbed portion in a central bore in a resilient stopper 38 mounted on the end of firing rod 32. By this arrangement, the fly trap 18 can be removed from the stopper 38 for repair or replacement leaving the stopper 38 on the end of the firing rod 32 so as to provide a protective part for the pointed front end of the firing rod 32.

As will be described more fully hereafter, firing rod 32 is mounted for movement between a "loaded" position, as shown in FIG. 3, and a "fired" position in which the firing rod 32 extends a substantial distance from the front end of barrel 12.

An actuating means is provided for causing the firing rod 32 to move rapidly from its "loaded" position to a "fired" position. This actuating means is cooperable with the trigger means 16 and is responsive to the movement of the trigger means between its "loaded" and "fired" positions.

Figure 6:
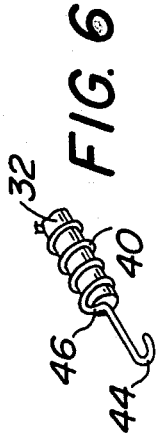
FIG. 6 is a fragmentary view of a detail.
Figure 4:
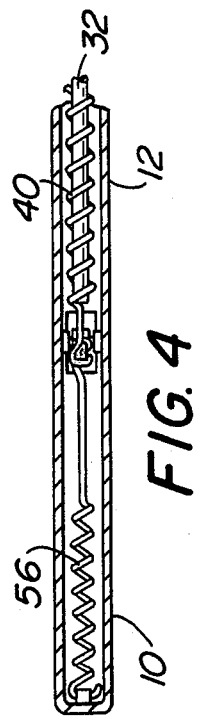
FIG. 4 is a sectional view taken on line 4—4 of FIG. 3.

The actuating means shown in the preferred embodiment comprises an elongated tension spring 40. Spring 40 is located in the hollow portion of the barrel 12 and has the firing rod 32 extending through the interior thereof as is shown in FIG. 3. The forward end of spring 40 is fixedly secured at the front end of the barrel by a suitable stop member 42 formed therein. The free end of spring 40 can be stretched until a hook portion 44 thereof engages the movable trigger 50 of the trigger means 16. At the base of this hook portion 44 the spring 42 has a straight portion 46 that extends across the center of the helically wound spring 42 so as to be contactable with the rear end of the firing rod 32 as is shown in detail in FIG. 6.

The trigger means 16 is best shown in FIG. 3 and comprises the trigger 50 which is pivotally mounted at 52 in body 10 and comprises a portion extending downwardly from the pivot 52 through an opening 54 in body 10 into a region enclosed by a conventional trigger guard. This lower extended portion of the trigger 50 is located so as to be gripped by the finger of the user of the fly trap gun in a manner similar to a conventional rifle. The upper portion of trigger 50 is aligned with an opening 55 in body 10 providing access to this region. The upper portion of trigger 50 located within body 10 is biased toward the rear of body 10 by a tension spring 56 which is connected in tension between the upper portion of trigger 50 and the end of body 10 as is shown in FIG. 3. The spring force of spring 56 is much greater than that of spring 40. By this arrangement, trigger 50 is biased to the "locked" position of the trigger means 16 by the spring 56 so that in this "locked" position of the trigger means 16, the trigger 50 will hold the spring 40 in its stretched or tensioned condition as shown in FIG. 3 by engagement with the hook portion 44 as shown in this Figure. When the lower portion of trigger 50 is pulled rearwardly by the user of the gun to cause a clockwise pivotal movement thereof against the bias of spring 56 as viewed in FIG. 3, the trigger 50 will be moved so that hooked portion 44 will be released from its engaged position allowing the spring 40 to move rapidly to its normally compressed condition and causing a corresponding actuating movement of the firing rod 32 toward the right as viewed in FIG. 3.

Means are provided for guiding firing rod 32 as it moves between its "locked" and "fired" positions, such means comprising a guide support 60 on the top of the front portion of barrel 12, as shown in FIGS. 1 and 3. The guide support 60 is provided with a bore 62 extending longitudinally of barrel 12 in spaced-apart parallel relation with the longitudinal axis of barrel 12. A guide rod 64 is mounted for slidable movement within the bore 62 and has its front end 66 bent downwardly and secured to the firing rod 32, as by welding, so that the guide rod 64 and firing rod 32 move conjointly along the longitudinal axis of barrel 12.

The rear end of the guide rod 64 is provided with a shock absorbing means 70 in the form of a spring 72 mounted between a pair of stops 74 and 76. The end stop 74 is secured to the guide rod 64 while the other stop 76 and the spring 72 are slidable on the guide rod 64. By this arrangement, the shock absorbing means 70 serves to limit the movement of the guide rod 64 away from the front end of barrel 12 so as to retain the guide rod 64 on the guide support 60 and to absorb the shock of the rapid movement of the guide rod 64 to the right in the event the stop 76 comes into contact with the rearward end of the guide support 60 during a firing movement thereof.

Means are provided for restricting the conjoint movement of the firing rod 32 and the guide rod 64 in the return direction toward the front end of the barrel 12. Such means is shown in detail in FIG. 8 and comprises a spring-biased ratchet means 80 adapted to engage a plurality of notches 65 formed in the guide rod 64 as best shown in FIGS. 1 and 3.

Ratchet means 80 comprises a lever arm 81 pivoted at a medial location on a horizontal pivot pin 83 mounted on a yoke-like support 84 formed on the front end of guide support 60. The forward end of lever arm 81 is bent downwardly and the rearward end of lever arm 81 is spring-biased upwardly by means of a compression spring 86 positioned in compression between the rearward end of lever arm 81 and guide support 60 as shown in FIG. 8. By this arrangement, the front tip 88 of lever arm 81 is biased into frictional contact with guide rod 64 so as to hold the same against movement. With the parts in the position shown in FIG. 8, any attempted movement of guide rod 64 toward the rear of the gun will be restricted by engagement of the end 88 of lever arm 81 in one of the notches 65. The ratchet means 80 will release guide rod 64 for rearward movement when the rearward end of lever arm 81 is depressed toward guide support 60 whereby the end 88 is raised out of contact with guide rod 64.

A resilient tip 34 is secured on the front end of the barrel 12 to frictionally engage the firing rod 32. Tip 34 serves to provide a small frictional resistance on the firing rod 32 so as to hold the rod 32 from falling downwardly in the event the user is shooting in a downward direction. Tip 34 merely serves as a backup for the spring-biased ratchet means 80 which would normally prevent this type of downward movement of the firing rod 32.

Figure 7:
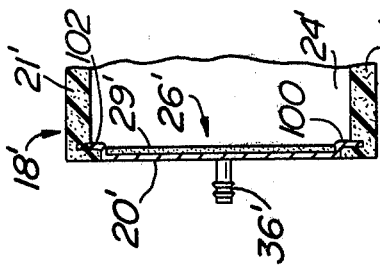
FIG. 7 is a sectional view of a modified form of the fly trap.

In FIG. 7 there is shown a form of fly trap wherein the base portion is replaceable. The fly trap 18' is essentially the same as the fly trap 18 wherefore corresponding parts have been given like reference numerals with primes added. Fly trap 18' is comprised of a rectangular base portion 20' and a rectangular side wall portion, the side walls of which are indicated at 21', 23' and 24' in FIG. 7. The base and side wall portions cooperate to define a trap chamber 26'. Base portion 20' is comprised of a relatively stiff plastic construction and has a rectangular outside border portion 100 adapted to be removably received in a slot-like recess 102 formed in the internal wall of the side walls 21'-24' of the side wall portion. The parts are constructed and arranged so that base portion 20' is removable from the side wall portion when desired so that it can be replaced with a new base portion of the same construction.

Base portion 20' is preferably made of a clear plastic and has the internal wall thereof coated with a sticky substance 29' for catching flies or the like trapped in the trap chamber 26' during the use of the device. A pin 36' projects from the back side of base portion 20' for use in mounting the fly trap 18' onto the resilient stopper 38 on the end of firing rod 32.

In the use of the fly trap gun in accordance with the invention the parts will be placed in the "loaded" position shown in FIGS. 1 and 2 in preparation for use in the catching of a flying insect. In order to place the parts in this position, the user pulls rearwardly on guide rod 64 to move the guide rod 64 and firing rod 32 rearwardly, which movement stretches the spring 40 to the position shown in FIG. 3 so as to place the hooked end 44 of the spring 40 in engagement with the upper portion of trigger 50. The strong spring 46 holds the parts in this position. The user then aims the fly trap at a flying insect that has come to rest on a surface such as a wall or table and moves the trap 18 relatively close to the insect so as not to disturb it. The trigger 50 is then pulled rearwardly against the bias of spring 56 so as to pivot the upper portion thereof downwardly to release the hooked end 44 therefrom. The spring 40 then compresses abruptly to propel the firing rod 32 forwardly by reason of the contact between portion 46 and the rear end of the firing rod 32. The movement of the firing rod 32 is guided by means of the guide rod 64 and the foam side wall portion of fly trap 18 will come into sealing contact with the surface with a flying insect trapped in trap chamber 26. Ratchet means 80 holds the parts in this extended position. The user then views the flying insect through the transparent base portion 20 and observes when it has been caught on the transparent sticky substance 29. The transparency of base portion 20 aids in catching the flying insect since the insect tends to fly toward the light passing through base portion 20. The user then removes the fly trap gun from contact with the surface, taking with it the caught flying insect without having caused any smudging of the surface on which the insect had rested.

The user then returns the fly trap gun to the locked position in preparation for a subsequent firing to catch another flying insect.

Figure 5:
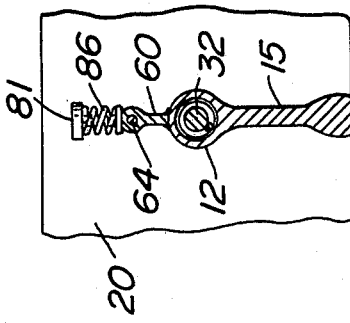
FIG. 5 is a sectional view taken on line 5—5 of FIG. 3.

FIG. 5 illustrates how the fly trap gun of the invention can be used to catch a flying insect positioned on a horizontal surface such as a table. In this method of use of the fly trap gun of the invention, the forward handle portion 15 is rested on top of the horizontal surface with the bottom side wall 23 being positioned just above the horizontal surface. When the gun is actuated from the "locked" position to a "fired" position, the bottom wall 23 will move along the horizontal surface to pick up the flying insect therefrom and cause the insect to come into contact with the sticky portion 29. The sloped portion 28 aides in this operation by scooping up the insect from the horizontal surface as the fly trap 18 moves rapidly thereacross.

What is claimed is:

1. A fly trap gun comprising
an elongated barrel,
a handle projecting from said barrel,
a trigger means mounted adjacent to said handle and movable between a loaded position and a fired position,
a fly trap including base and side wall portions the internal surfaces of which define a trap chamber,
means providing a sticky area throughout a substantial portion of the surface of said trap chamber for catching flying insects trapped in said trap chamber,
a firing rod mounted for longitudinal movement within said barrel and having an extended end located outside of the front end of said barrel,
said firing rod being mounted for movement between a loaded position and a fired position, including means for guiding said firing rod as it moves between said loaded and fired positions inclusive of a guide support and a guide rod mounted for slidable movement in said guide support longitudinally along said gun barrel, said guide rod being secured to said firing rod for conjoint movement therewith, including means for restricting movement of said firing rod and said guide rod in the direction toward the front end of said barrel, said restricting means comprising a ratchet means inclusive of a lever means movable into and out of engagement with notches formed along the length of said guide rod,
actuating means for causing said firing rod to move rapidly from said loaded position to said fired position,
said actuating means being cooperable with said trigger means and responsive to the movement of said trigger means between said loaded and fired positions,
and means for mounting said fly trap on the extended end of said firing rod for movement therewith as said firing rod moves between said loaded and fired positions.

2. A fly trap gun according to claim 1 wherein said ratchet means includes means biasing said lever so that an end portion thereof moves into contact with said guide rod.

3. A fly trap gun according to claim 1 wherein said base portion of said fly trap and said sticky substance are both made of transparent materials whereby the interior of said trap chamber is visible.

* * * * *